United States Patent
Perkinson et al.

(10) Patent No.: US 9,929,932 B2
(45) Date of Patent: Mar. 27, 2018

(54) LOCATING TRAFFIC ORIGIN IN A NETWORK

(71) Applicant: Adtran, Inc., Huntsville, AL (US)

(72) Inventors: David Perkinson, Madison, AL (US); Mark C. Rudolph, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 102 days.

(21) Appl. No.: 14/826,043

(22) Filed: Aug. 13, 2015

(65) Prior Publication Data

US 2017/0048128 A1 Feb. 16, 2017

(51) Int. Cl.
*H04L 12/751* (2013.01)
*H04L 12/721* (2013.01)
*H04L 12/46* (2006.01)
*H04L 12/753* (2013.01)

(52) U.S. Cl.
CPC .......... *H04L 45/02* (2013.01); *H04L 12/4641* (2013.01); *H04L 45/48* (2013.01); *H04L 45/66* (2013.01); *Y02D 30/30* (2018.01)

(58) Field of Classification Search
CPC ...... H04L 45/02; H04L 12/4641; H04L 45/66
See application file for complete search history.

(56) References Cited

U.S. PATENT DOCUMENTS

| | | | |
|---|---|---|---|
| 7,870,246 B1 * | 1/2011 | Davis | H04L 41/12 709/220 |
| 9,037,748 B2 * | 5/2015 | Nguyen | H04L 43/0811 709/242 |
| 2006/0209852 A1 * | 9/2006 | Wakumoto | H04L 45/02 370/401 |

* cited by examiner

*Primary Examiner* — Jeffrey M Rutkowski
*Assistant Examiner* — Chae S Lee
(74) *Attorney, Agent, or Firm* — Smith Tempel Blaha LLC; Michael J. Tempel

(57) ABSTRACT

The switch port at which traffic associated with a specified media access control (MAC) address originates is searched for in a local area network (LAN). One or more switches receive a broadcast discovery message on a LAN subnet. Each switch determines whether the MAC address identified by the discovery message is associated with one of its ports. If the switch determines that the MAC address is associated with one of its ports, then the switch determines whether that port defines an edge of a searchable space. If the switch determines that that port defines an edge of the searchable space, then the switch issues a response message identifying the switch and the port.

6 Claims, 4 Drawing Sheets

LOCATING TRAFFIC ORIGIN IN A NETWORK

BACKGROUND

A common problem that occurs in a Local Area Network (LAN) or other Internet Protocol (IP) network is when one network device connected to the network adversely affects the entire network performance. The behavior of that offending network device often impacts normal network performance. For a network administrator to address the problem, it is often necessary for the administrator to determine where the offending network device is physically located in a building and to determine the connection status of the offending network device to network switches or similar network devices. This information needs to be determined quickly, so action can be taken to restore the network to normal performance.

Each network device includes a universally unique identifier, known as the device's Media Access Control (MAC) address. In a network having a number of network switches, such as layer-2 Ethernet switches, each network switch maintains a table of MAC addresses and the physical port on which that MAC address was learned. For example, a faulty network device could have a bad MAC card and transmit packets in an out-of-control manner. In another example, a server could use an IP address of x.x.x.x with its MAC information and address. A computer as a network device could previously have had that IP address of x.x.x.x. The user of that computer may not have used that computer for six months. When the user boots six months later, that user maintains the static IP address of x.x.x.x for their computer, which advertises itself to the network and other users as that IP address. In operation, other users (including the user of the now-offending computer) may be trying to access the server that has the IP address of x.x.x.x. Because traffic is redirected from that correct server to the offending computer, the network does not operate properly. Again, the offending computer with the wrong IP address needs to be located quickly and efficiently. An even worse scenario is when a user of an offending device must be located because of malicious behavior. It may be even more critical in such a scenario to locate the offending device quickly and efficiently.

One known solution to the problem of locating an offending network device based on its MAC address is for a technician or other administrator to log-in manually into each network switch and determine if the faulty or otherwise offending network device is directly connected to that network switch. If the administrator determines that the offending network device is connected to a certain switch port, the administrator may take action that may include shutting down the port, isolating the offending network device on a separate virtual LAN (VLAN), rate limiting the offending network device, blocking all traffic having the device's MAC address, etc. This manual log-in technique is a lengthy, cumbersome process, especially in larger networks where there are many network switches to search. Also, a detailed knowledge of the network architecture is required, thus requiring the administrator searching for the offending network device to determine if the device is directly connected to the network switch or if the MAC address was learned on a switch port that is tied to another network switch. For example, the offending network device could be located multiple hops away.

Another solution to the problem of locating an offending network device is described in U.S. Pat. No. 8,380,828, entitled "System and Method for Locating Offending Network Device and Maintaining Network Integrity." This solution involves employing the Link Layer Discovery Protocol (LLDP) to propagate a discovery protocol frame through the network. The discovery protocol frame contains organizationally specific Type-Length-Value (TLV) information that identifies the MAC address of the offending network device and other information that may assist a switch in participating in and responding to the search. Each switch consults its table of learned MAC addresses to determine whether the MAC address of the offending network device is associated with one of its ports. If the switch determines that the MAC address is associated with one of its ports, the switch provides a response.

The foregoing method of propagating a discovery protocol frame through the network using LLDP does not provide a complete solution to the problem unless every switch in the network is capable of determining whether the MAC address of the offending network device is associated with one of its ports and responding accordingly. A switch must be configured with corresponding software in order to participate in this method. Thus, the method is impeded in a network in which one or more switches are not configured with the requisite software. For example, a network may include switches associated with one switch manufacturer that the manufacturer has configured to participate in the method (e.g., configured with software), as well as switches associated with other manufacturers that have not been so configured. The discovery protocol frame cannot traverse a switch that is not so configured. Thus, a non-configured switch interposed in the network between configured switches presents an obstacle to configured switches downstream from the non-configured switch determining whether the MAC address of the offending network device is associated with any of their ports. It would be desirable to provide an improved method and system in which non-configured switches present less of an obstacle.

SUMMARY

Embodiments of the invention relate to a system, method, and computer program product for searching for a port in a local area network associated with a specified MAC address. In an illustrative or exemplary embodiment, a method begins with one or more switches receiving a discovery message broadcast on a subnet of the LAN. Each switch determines whether the MAC address identified by the discovery message is associated with one of its ports. If the switch determines that the MAC address is associated with one of its ports, then the switch determines whether that port defines an edge of a searchable space. If the switch determines that that port defines an edge of the searchable space, then the switch issues a response message identifying the switch and the port.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
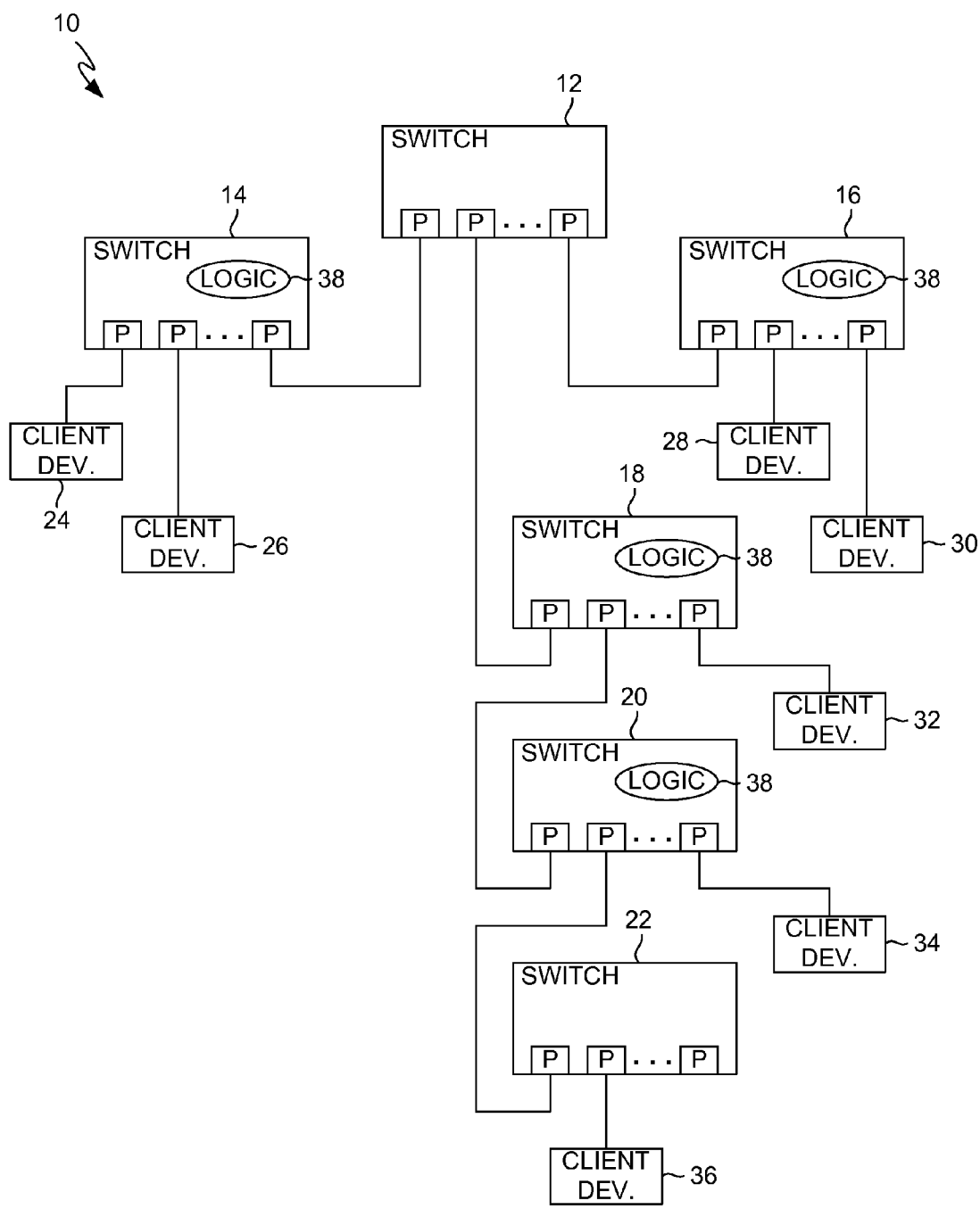
FIG. 1 is a block diagram of an exemplary LAN, in accordance with an exemplary embodiment of the invention.

An exemplary method can be employed to locate an offending client device in a network. As illustrated in FIG. 1, in an illustrative or exemplary embodiment of the invention, a LAN 10 includes a number of switches 12, 14, 16, 18, 20 and 22. For purposes of illustrating the principles of the system and method with respect to an exemplary embodiment, only these seven switches 12-22 are shown in FIG. 1. However, other embodiments (not shown) can include any number of such switches or similar network devices. Also, the interconnection or network topology among switches 12-22 that is shown in FIG. 1 is intended only to serve as an example for purposes of illustrating the principles of the system and method. In other embodiments, such switches or similar network devices can be interconnected in any other suitable manner. Similarly, an exemplary number of client devices 24, 26, 28, 30, 32, 24 and 36 are connected to ports ("P") of switches 12-22 in an exemplary configuration. Client device 24-36 can include, for example, computers, IP telephones, IP cameras, etc.

Note that each of switches 14, 16, 18 and 20 is configured with logic 38, while the remaining switches 12 and 22 of LAN 10 are not configured with such logic 38. Logic 38 enables each of switches 14, 16, 18 and 20 to perform the methods described herein, as well as the LLDP-based methods disclosed in U.S. Pat. No. 8,380,828, the disclosure of which is incorporated herein in its entirety by this reference.

Consider a scenario or instance in which an administrator desires to determine the location in LAN 10 of an offending client device, which is known to the administrator only by its MAC address. Suppose, for example, the administrator is using client device 30 to access LAN 10 for this purpose. Client device 30 is connected to a port of switch 16. It can be noted that the LLDP-based methods described in U.S. Pat. No. 8,380,828 cannot determine whether the offending client device is connected to any of switches 14, 18, 20 or 22 because the LLDP discovery message cannot propagate from switch 16 through switch 12 to the remainder of LAN 10, as switch 12 is not configured with logic 38.

Embodiments of the present invention avoid the above-described problem by employing IP subnet communication instead of LLDP to propagate a discovery frame through LAN 10. In the exemplary embodiment, all of switches 12-22 belong to the same IP subnet, such as a management VLAN. Using client device 30, for example, an administrator can broadcast a discovery message via the IP subnet.

Figure 2:
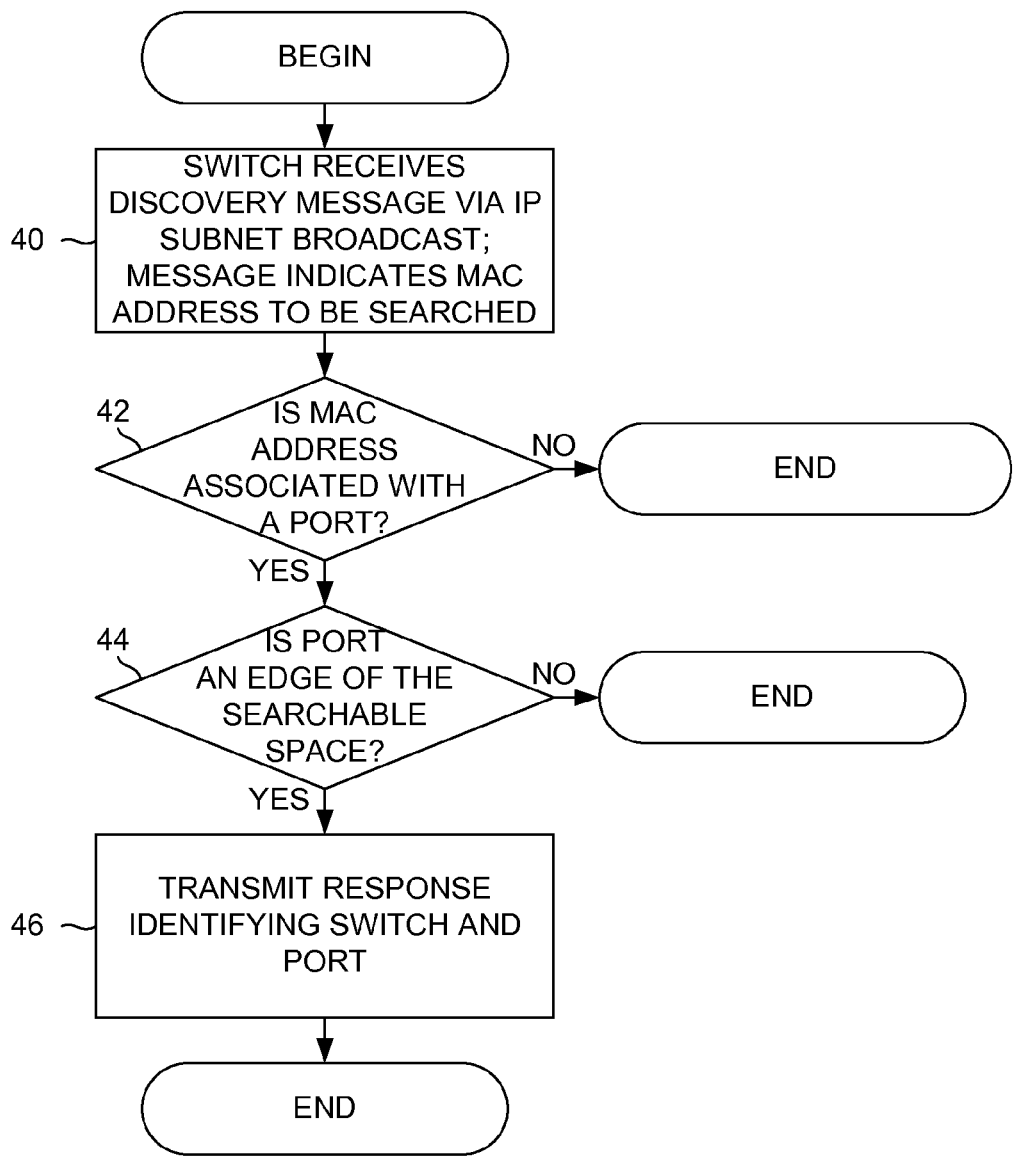
FIG. 2 is a flow diagram illustrating an exemplary method of operation of a switch in the LAN of FIG. 1.

The flow diagram of FIG. 2 illustrates an exemplary method by which each of switches 12-22 can operate in network 10. As described in further detail below, logic 38 enables each of switches 14, 16, 18 and 20 to perform this method. It should be noted that each of switches 12-22 can receive the broadcast message originating from client device 30 because all of switches 12-22 belong to the same IP subnet. That is, the condition that enables a switch 12-22 to receive the message is that it belongs to the IP subnet over which the message is broadcast; whether a switch 12-22 is configured with logic 38 is not relevant to whether it is capable of receiving the broadcast message.

As indicated by block 40, an exemplary switch, which can be any of switches 12-22, receives the broadcast message. The broadcast message contains or identifies the MAC address of the offending client device. As indicated by block 42, the exemplary switch determines whether that MAC address is associated with one of its ports. If the switch determines (block 42) that the MAC address is not associated with one of its ports, then the switch does nothing further, i.e., the method ends. If the switch determines (block 42) that the MAC address is associated with one of its ports, then the switch further determines whether that port defines an edge of the searchable space, as indicated by block 44. The term "searchable space" refers to a network of switches (i.e., capable of communicating with each other via IP) that are configured with logic 38. For example, switches 18 and 20 define a searchable space, with the ports of switch 20 defining an edge of the searchable space. In other words, an edge of the searchable space is defined by any switch port within the searchable space that is either not attached to another network switch (or other network device) or that is attached to a network device that is not configured with logic 38.

Logic 38 also configures each of switches 14, 16, 18 and 20 to communicate using spanning tree protocol. As well understood by persons skilled in the art, spanning tree protocol is set forth in, for example, RFC 802.1d and RFC 802.1w. As configuring a network switch to communicate using spanning tree protocol is well understood in the art, the details of such configuration and its effect on network operation are not described herein. However, it should be appreciated that a switch configured with spanning tree protocol inherently transmits spanning tree packets at closely spaced intervals on a continuous basis, such as, for example, once per second. Commercially available spanning tree protocol software commonly allows a system administrator to configure a switch to send spanning tree packets at any selected interval between one and 10 seconds. Accordingly, in the exemplary embodiment described herein, spanning tree packets are continuously being exchanged among switches 14, 16, 18 and 20 because they are configured with spanning tree protocol.

Logic 38 also configures each of switches 14, 16, 18 and 20 to communicate using LLDP frames that contain a unique identifier (i.e., uniquely identifiable as being associated with the searchable space). Such an LLDP frame can contain the unique identifier in, for example, the organizationally specific Type Length Value (TLV) field, as described in above-referenced U.S. Pat. No. 8,380,828. Accordingly, packets containing LLDP frames containing the unique identifier are continuously being exchanged among switches 14, 16, 18 and 20.

As indicated by block 44, if the switch determines that the port does not define an edge of the searchable space, then the switch does nothing further, i.e., the method ends. However, if the switch determines (block 44) that the port defines an edge of the searchable space, then the switch transmits a response message, identifying itself and the port, as indicated by block 46. The response message reaches client device 30 because the response message is in response to the discovery message.

Figure 3:
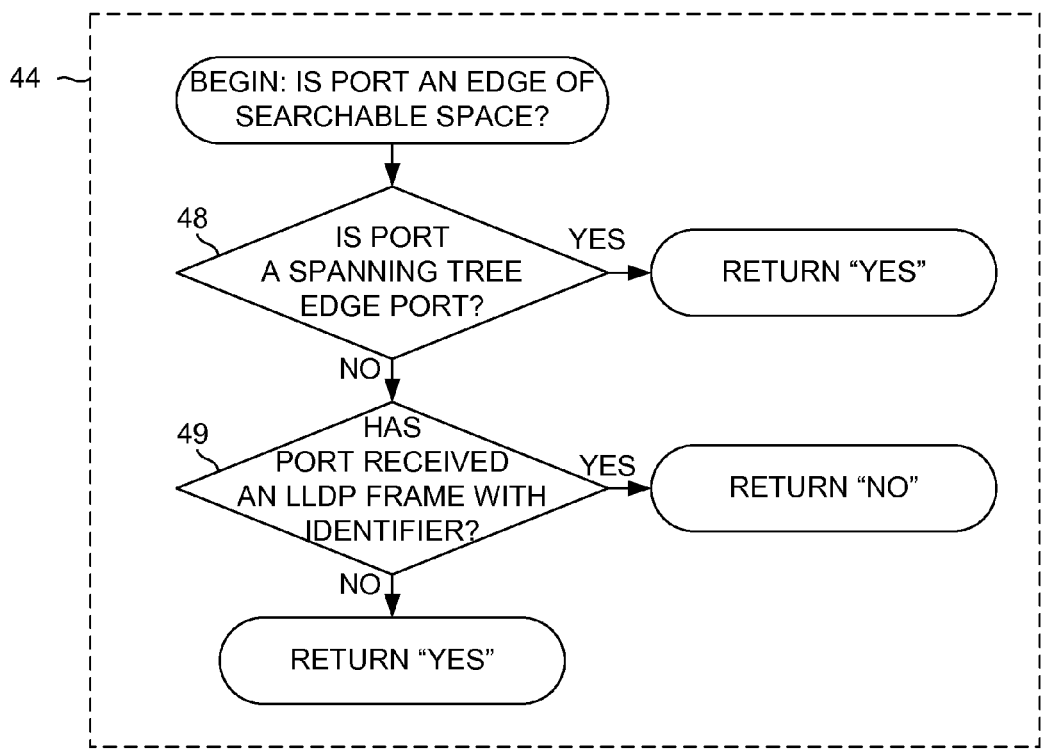
FIG. 3 is a flow diagram illustrating a portion of the flow diagram of FIG. 2 in further detail.

Block 44 (determining whether a port defines an edge of a searchable space) is illustrated in further detail in FIG. 3 as comprising blocks 48 and 49. As indicated by block 48, the switch determines whether the port is a spanning tree edge port. As understood by persons skilled in the art, switches configured with spanning tree protocol are capable of determining whether a port is a spanning tree edge port. Accordingly, the manner in which a switch may perform this determination is not described in further detail herein. If the switch determines (block 48) that the port is a spanning tree edge port, then the determination represented by block 44 returns "yes" as a result, i.e., the port defines an edge of the searchable space. However, as indicated by block 49, if the switch determines (block 48) that the port is not a spanning tree edge port, then the switch further determines whether the switch has received an LLDP frame having the above-referenced unique identifier. If the switch determines (block 49) that it has received an LLDP frame having the above-referenced unique identifier, then the determination represented by block 44 returns "no" as a result, i.e., the port does not define an edge of the searchable space. However, if the switch determines (block 49) that it has not received an LLDP frame having the unique identifier, then the determination represented by block 44 returns "yes" as a result, i.e., the port defines an edge of the searchable space.

It should be understood that the method described above is not intended to represent the entirety of the operation of each of switches 12-22, LAN 10, or any portion thereof. Rather, the method described above represents only those operational aspects that are most directly related to the exemplary embodiment of the invention. Other operational aspects of switches 12-22, such as those that are conventional, may not be described herein, as they are well understood by persons skilled in the art. Except as otherwise stated herein, each of switches 12-22 operates not only in the manner described above but also in a conventional manner.

Consider an example in which the MAC address identified by the discovery broadcast message identifies client device 36 (FIG. 1). The broadcast message generated by client device 30 propagates to every one of switches 12-22 because they all belong to the same management VLAN. In this example, switches 12, 18, 20 and 22 are aware of the MAC address of client device 36. That is, in IP networking terminology, switches 12, 18, 20 and 22 have "learned" the MAC address of client device 36. Of these switches, neither switch 12 nor switch 22 can perform the method described above with regard to FIGS. 2-3 because neither switch 12 nor switch 22 is configured with logic 38. However, each of switches 18 and 20 in this example responds to receipt of the broadcast discovery message by performing the method described above with regard to FIGS. 2-3. In this example, switch 18 does not issue any response because it determines that the port with which the MAC address is associated does not define an edge of a searchable space. However, switch 20 issues a response message, identifying the port to which client device 36 is connected, because the port defines an edge of a searchable space. The administrator can receive the response message at client device 30. As the response message identifies switch 20 and the port with which the MAC address is associated, the administrator can then investigate switch 20 to determine what is connected to that port, leading the administrator to find that client device 36 is connected via switch 22.

Figure 4:
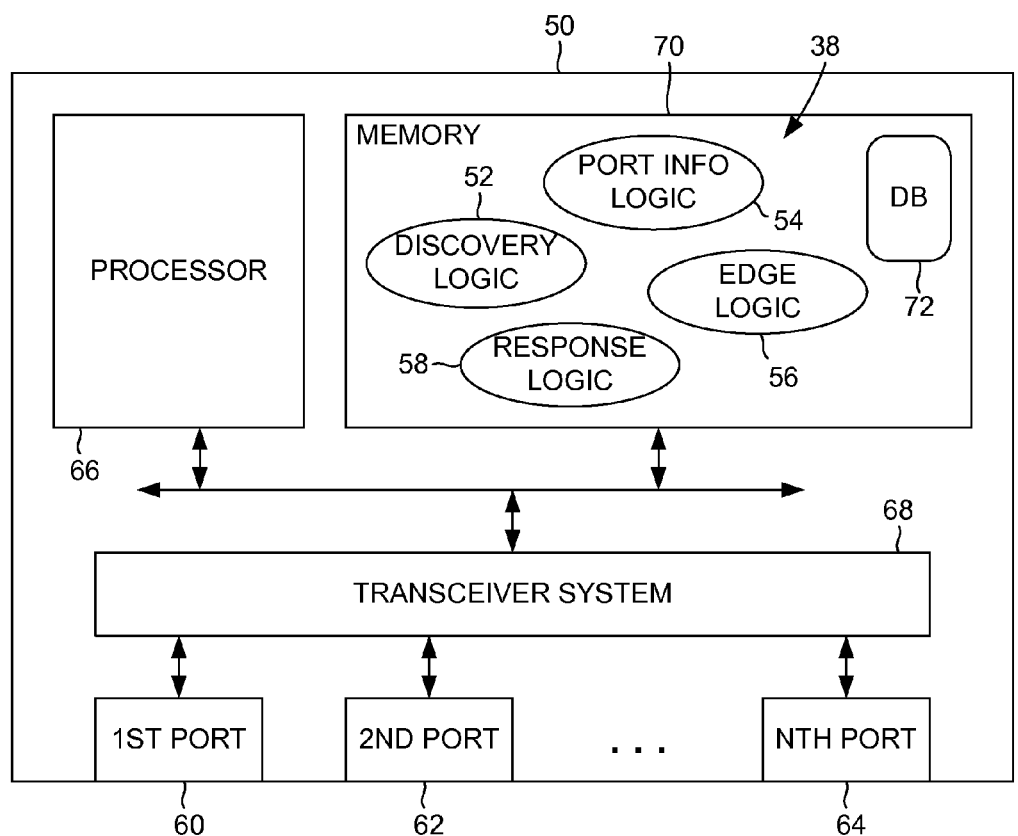
FIG. 4 is a block diagram of an exemplary switch in the LAN of FIG. 1.

As illustrated in FIG. 4, a switch 50 represents each one of switches 14, 16, 18 and 20. That is, switch 50 is configured with logic 38. Logic 38 includes discovery logic 52, port information logic 54, edge logic 56, and response logic 58. Switch 50 also includes a number ("N") of physical ports 60, 62, 64, etc., where in an exemplary embodiment N can be any number greater than one. Switch 50 further includes a processor 66, a transceiver system 68 and a memory 70. Transceiver system 68 couples ports 60, 62, 64, etc., to a processing system defined by processor 66 as programmed or configured by software (or firmware, etc.). Logic 38 represents the configuration of processor 66 defined by a corresponding portion of such software. Additional logic (not shown) defines the configuration of processor 66 to perform conventional Ethernet switch functions. As such conventional functions are well understood by persons skilled in the art, they are not described herein.

Although the foregoing logic elements are shown in FIG. 4 in a conceptual manner as stored in or residing in memory 70, persons skilled in the art understand that such logic elements arise through the operation of processor 66 in accordance with conventional computing device principles. That is, software or firmware contributes to programming or configuring the processing system, comprising processor 66 and memory 70, to be characterized by such logic elements. Although memory 70 is depicted as a single or unitary element, memory 70 can be of any suitable type and can have any suitable structure, such as one or more modules, chips, etc. Memory 70 can be of a suitable non-volatile type, such as flash memory.

It should be understood that the combination of memory 70 and the above-referenced logic elements or software, firmware, instructions, etc., underlying the logic elements, as stored in memory 70 in non-transitory computer-readable form, defines a "computer program product" as that term is understood in the patent lexicon. In view of the descriptions herein, persons skilled in the art will readily be capable of providing suitable software or firmware or otherwise configuring switch 50 to operate in the manner described. Also, although the effect of each of the above-referenced logic elements is described herein, it should be understood that the effect may result from contributions of two or more logic elements in concert, or from contributions of the logic elements and conventional switch logic elements or other network features that are not shown for purposes of clarity.

Discovery logic 52 contributes to the configuring of the processing system of switch 50 to receive the discovery broadcast message and the MAC address identified therein. Port information logic 54 contributes to the configuring of the processing system of switch 50 to determine whether the MAC address identified in the discovery broadcast message is associated with a port of switch 50. A table or other database 72 maintained in memory 70 identifies learned MAC addresses and the ports of switch 50 with which they are associated. Database 72 can be maintained in a conventional manner, as understood by persons skilled in the art. Edge logic 56 contributes to the configuring of the processing system of switch 50 to determine whether an identified port defines the edge of a searchable space. Edge logic 56 can include spanning tree logic that contributes to determining whether a port defines a spanning tree edge, as well as participation logic that contributes to determining whether the switch has the above-described LLDP relationship with a neighboring switch. Response logic 58 contributes to the configuring of the processing system of switch 50 to transmit a response identifying the switch and port.

One or more illustrative or exemplary embodiments of the invention have been described above. However, it is to be understood that the invention is defined by the appended claims and is not limited to the specific embodiments described.

What is claimed is:

1. A method for searching a local area network (LAN) for an offending client device having a media access control (MAC) address identifying the offending client device, comprising:

receiving, at each switch in a searchable space among a plurality of switches in the LAN and in a management virtual LAN (VLAN) subnet of the LAN, a broadcast discovery message on the management VLAN subnet from an administrator client device, the broadcast discovery message conveying the MAC address identifying the offending client device, each switch in the searchable space being configured to communicate using spanning tree protocol and Link Layer Discovery Protocol (LLDP) frames having a unique identifier uniquely identifying the searchable space, each switch in the searchable space being configured to perform a method comprising:

determining, by the switch, in response to receiving the broadcast discovery message, if the MAC address is associated with a port of the switch;

in response to a determination by the switch that the MAC address is associated with a port of the switch, the switch determining whether the port defines an edge of the searchable space by the switch determining whether the port defines a spanning tree edge, wherein a determination by the switch that the port defines a spanning tree edge indicates the port defines an edge of the searchable space, and in response to a determination that the port does not define a spanning tree edge, by the switch further determining whether the port has received an LLDP frame containing the unique identifier, wherein a determination by the switch that a port that does not define a spanning tree edge has not received an LLDP frame containing the unique identifier indicates the port defines an edge of the searchable space; and in response to a determination that the MAC address is associated with a port and a determination that the port defines an edge of a searchable space, the switch issuing a response message to the administrator client device identifying the switch and the port defining the edge of the searchable space.

2. The method of claim 1, wherein the local area network is an Ethernet, and the subnet is defined by Internet Protocol (IP).

3. A local area network (LAN) switch operable within a searchable space of the LAN, comprising:

a plurality of physical ports; and a processing system comprising a processor and a memory, the processing system configured to include:

port information logic configured to store in the memory information identifying each media access control (MAC) address associated with one of the physical ports;

discovery logic configured to receive a broadcast discovery message from an administrator client device on a management virtual LAN (VLAN) subnet of the LAN, the broadcast discovery message conveying a MAC address identifying an offending client device, the discovery logic further configured to determine if the MAC address identified by the broadcast discovery message is associated with a port of the switch;

edge logic configured to, in response to a determination that the MAC address is associated with a port of the switch, determine whether the port defines an edge of the searchable space by determining whether the port defines a spanning tree edge, wherein a determination by the edge logic that the port defines a spanning tree edge indicates the port defines an edge of the searchable space, and in response to a determination that the port does not define a spanning tree edge, by the edge logic further determining whether the port has received an LLDP frame containing a unique identifier uniquely identifying a searchable space, wherein a determination by the switch that a port that does not define a spanning tree edge has not received an LLDP frame containing the unique identifier indicates the port defines an edge of the searchable space; and response logic configured to, in response to a determination that the MAC address is associated with a port and a determination that the port defines an edge of a searchable space, issue a response message to the administrator client device identifying the switch and the port defining the edge of the searchable space.

4. The LAN switch of claim 3, wherein the local area network is an Ethernet, and the subnet is defined by Internet Protocol (IP).

5. A computer program product for enabling each switch in a searchable space among a plurality of switches in a local area network (LAN) and in a management virtual LAN (VLAN) subnet to participate in searching for an offending client device having a media access control (MAC) address identifying the offending client device, the computer program product comprising a non-transitory computer-readable medium having stored thereon in computer-readable form instructions that when executed by a processing system of the switch causes the switch to control a method comprising:

receiving, by each switch in the searchable space, a broadcast discovery message on the (VLAN) subnet from an administrator client device, the broadcast discovery message conveying the MAC address identifying the offending client device, each switch in the searchable space being configured to communicate using spanning tree protocol and Link Layer Discovery Protocol (LLDP) frames having a unique identifier uniquely identifying the searchable space, each switch in the searchable space being configured to perform a method comprising:

determining if the MAC address is associated with a port of the switch;

in response to a determination that the MAC address is associated with a port of the switch, determining whether the port defines an edge of the searchable space by the switch determining whether the port defines a spanning tree edge, wherein a determination by the switch that the port defines a spanning tree edge indicates the port defines an edge of the searchable space, and in response to a determination that the port does not define a spanning tree edge, by the switch further determining whether the port has received an LLDP frame containing the unique identifier, wherein a determination by the switch that a port that does not define a spanning tree edge has not received an LLDP frame containing the unique identifier indicates the port defines an edge of the searchable space; and in response to a determination that the MAC address is associated with a port and a determination that the port defines an edge of a searchable space, the switch issuing a response message to the administrator client device identifying the switch and the port defining the edge of the searchable space.

6. The computer program product of claim 5, wherein the local area network is an Ethernet, and the subnet is defined by Internet Protocol (IP).

* * * * *